(12) United States Patent
Carvajal

(10) Patent No.: US 11,825,283 B2
(45) Date of Patent: Nov. 21, 2023

(54) AUDIO FEEDBACK FOR USER CALL STATUS AWARENESS

(71) Applicant: BOSE CORPORATION, Framingham, MA (US)

(72) Inventor: Santiago Carvajal, Ashland, MA (US)

(73) Assignee: Bose Corporation, Framingham, MA (US)

(*) Notice: Subject to any disclaimer, the term of this patent is extended or adjusted under 35 U.S.C. 154(b) by 170 days.

(21) Appl. No.: 17/065,863

(22) Filed: Oct. 8, 2020

(65) Prior Publication Data

US 2022/0116706 A1  Apr. 14, 2022

(51) Int. Cl.
| | |
|---|---|
| *H04R 5/033* | (2006.01) |
| *H04R 3/04* | (2006.01) |
| *H04L 65/403* | (2022.01) |
| *H04L 65/60* | (2022.01) |
| *H04M 3/56* | (2006.01) |

(52) U.S. Cl.
CPC .......... *H04R 5/033* (2013.01); *H04L 65/403* (2013.01); *H04L 65/60* (2013.01); *H04M 3/568* (2013.01); *H04R 3/04* (2013.01); *H04R 2430/01* (2013.01)

(58) Field of Classification Search
CPC ...... H04R 5/033; H04R 3/04; H04R 2430/01; H04R 1/1083; H04R 2460/01; H04R 1/1041; H04L 65/403; H04L 65/60; H04L 65/764; H04L 65/1059; H04M 2203/50; H04M 3/568; H04M 1/82
USPC ....................................................... 379/207.02
See application file for complete search history.

(56) References Cited

U.S. PATENT DOCUMENTS

| | | | |
|---|---|---|---|
| 8,019,078 B2 | 9/2011 | Chavez et al. | |
| 8,878,678 B2* | 11/2014 | Liu ........................ | H04M 1/724 |
| | | | 379/162 |
| 9,300,795 B2 | 3/2016 | Deluca et al. | |
| 10,142,485 B1* | 11/2018 | Haus ...................... | H04M 3/568 |
| 2003/0185371 A1* | 10/2003 | Dobler .................. | H04M 1/247 |
| | | | 379/207.02 |
| 2008/0144794 A1* | 6/2008 | Gardner ................ | H04M 3/568 |
| | | | 379/202.01 |
| 2013/0272508 A1* | 10/2013 | DeLuca ................ | H04M 1/724 |
| | | | 379/88.01 |
| 2014/0226842 A1 | 8/2014 | Shenoy et al. | |

* cited by examiner

*Primary Examiner* — Xu Mei
(74) *Attorney, Agent, or Firm* — Patterson + Sheridan, LLP

(57) ABSTRACT

Aspects provide a wearable audio output device that provides an audio indication regarding a user's status with respect to a teleconference. The user is connected to at least one remote participant of a teleconference via the wearable audio output device. The wearable audio output device alters an audio stream to provide an indication of the user's status. Absent a visual indication, the user is intuitively aware of whether the microphone on the wearable audio output device is muted.

19 Claims, 5 Drawing Sheets

AUDIO FEEDBACK FOR USER CALL STATUS AWARENESS

FIELD

Aspects of the disclosure generally relate to a wearable audio output device providing audio feedback to a user based on a state of the user with respect to a teleconference. According to an example, the state of the user with respect to the teleconference refers to whether the microphone on the wearable audio output device is muted or not, thereby affecting whether or not teleconference participants can hear the user of the wearable audio output device speak.

BACKGROUND

People wear audio output devices as they and others in the vicinity engage in various activities. In part due to the comfort of wearable audio output devices and convenience of connectivity to other devices and the internet, users wear these devices for long periods of time. In an example, a user transitions between streaming music while exercising and participating in calls using the wearable audio output device. Currently, a user may look at a user interface (UI) on a connected personal user device or a computer screen to determine if the user is muted or not. Absent a visual indication on the UI, the user may not know their status while trying to talk to another party on the call. Accordingly, in one example, the user must retrieve the connected personal user device from a pocket or work bag to see the UI that indicates the user's mute status. In another example, a user may be more compelled to stay close to their computer screen so the user can quickly understand their mute status. Needing a visual indication to determine the user's status limits the user's ability to enjoy some of the benefits provided by wearable audio output devices. A need exists for improving the manner in which the user is alerted of their state with respect to a call.

SUMMARY

All examples and features mentioned herein can be combined in any technically possible manner.

Aspects provide a method performed by a wearable audio output device worn by a user, including a microphone. The method includes participating in a teleconference with one or more remote participants via a user device, wherein the user and the one or more remote participants share an audio stream supported by the teleconference and providing audio feedback to the user based on a state of the user with respect to the teleconference.

In aspects, the state of the user comprises one of: a listen mode wherein the microphone is muted so that speech of the user and environmental noise around the user are not heard by the remote participants, a whisper mode wherein the microphone is unmuted and the speech of the user and the environmental noise around the user are capable of being heard by a subset of the remote participants, or a talk mode wherein the microphone is unmuted and the speech of the user and the environmental noise are capable of being heard by all of the remote participants.

In aspects, providing the audio feedback comprises adding reverberation to the audio stream when the user is in the listen mode and removing the reverberation when the user subsequently changes from the listen mode to the talk mode.

In aspects, providing the audio feedback comprises spatializing the audio stream when the user is in the listen mode and removing the spatializing when the user subsequently changes from the listen mode to the talk mode.

In aspects, providing the audio feedback comprises simultaneously outputting an audio notification and the audio stream when the user switches between the listen mode and the talk mode.

In aspects, the audio notification is spatialized in a first manner to indicate switching from the listen mode to the talk mode, and the audio notification is spatialized in a second manner to indicate switching from the talk mode to the listen mode.

In aspects, providing the audio feedback comprises adjusting a feature of the audio stream to reduce an intelligibility of the audio stream when the user is in the listen mode and adjusting the feature of the audio stream to increase the intelligibility of the audio stream when the user subsequently changes from the listen mode to the talk mode.

In aspects, providing the audio feedback comprises outputting the audio stream to one ear of the user when the user is in the whisper mode, and outputting the audio stream to both ears of the user when the user is in the talk mode.

In aspects, the method further comprises simultaneously outputting a second audio stream with the audio stream supported by the teleconference, wherein providing the audio feedback comprises adjusting the second audio stream based on the state of the user.

In aspects, adjusting the second audio stream comprises reducing a volume of the second audio stream from a first volume to a second volume when the microphone is unmuted and increasing the volume from the second volume back to the first volume when the microphone is subsequently muted.

In aspects, providing the audio feedback comprises altering the audio stream based on the state of the user, outputting the altered audio stream to the user to indicate the state of the user, after outputting the altered audio stream, determining a change in the state of the user, re-altering the audio stream based on the change in the state of the user, and outputting the re-altered audio stream to the user to indicate the change in the state of the user.

In aspects, the wearable audio output device does not provide a visual indication of the state.

Certain aspects provide a wearable audio output device comprising a microphone and at least one processor coupled to the microphone, the at least one processor configured to: participate in a teleconference with one or more remote participants via a user device, wherein a user wearing the wearable audio output device and the one or more remote participants share an audio stream supported by the teleconference and provide audio feedback to the user based on a state of the user with respect to the teleconference.

In aspects, the state comprises one of: a listen mode wherein the microphone is muted so that speech of the user and environmental noise around the user are not heard by the remote participants, a whisper mode wherein the microphone is unmuted and the speech of the user and the environmental noise around the user are capable of being heard by a subset of the remote participants, or a talk mode wherein the microphone is unmuted and the speech of the user and the environmental noise are capable of being heard by all of the remote participants.

In aspects, the at least one processor provides the audio feedback by adding reverberation to the audio stream when the user is in the listen mode and removing the reverberation when the user subsequently changes from the listen mode to the talk mode.

In aspects, the at least one processor provides the audio feedback by spatializing the audio stream when the user is in the listen mode and removing the spatializing when the user subsequently changes from the listen mode to the talk mode.

In aspects, the wearable audio output device does not provide a visual indication of the state.

In aspects, the wearable audio output device further comprises a mute function for muting and unmuting both speech of the user and environmental noise around the user. In aspects, the mute function is activated by one of a capacitive user interface on the wearable audio output device or a hardware button on the wearable audio output device.

Certain aspects provide a wearable audio output device comprising a microphone and at least one processor coupled to the microphone, the at least one processor configured to: participate in a teleconference with one or more remote participants via a user device, wherein a user wearing the wearable audio output device and the one or more remote participants share an audio stream supported by the teleconference, alter the audio stream based on a state of the user, and output the altered audio stream to indicate the state of the user.

In aspects, the state comprises one of: a listen mode wherein the microphone is muted so that speech of the user and environmental noise around the user are not heard by the remote participants, a whisper mode wherein the microphone is unmuted and the speech of the user and the environmental noise around the user are capable of being heard by a subset of the remote participants, or a talk mode wherein the microphone is unmuted and the speech of the user and the environmental noise are capable of being heard by all of the remote participants.

In aspects, the at least one processor is configured to alter the audio stream by one of adding reverberation to the audio stream or spatializing the audio stream when the user is in the listen mode.

Aspects of the present disclosure provide methods, apparatus, and computer-readable mediums having instructions stored in memory which, when executed, cause a wearable audio output device to provide an audio indication of the user's status with respect to a teleconference. The user's status is associated with whether a participant or multiple participants on the teleconference can hear the user speak due to the user's microphone being muted.

DETAILED DESCRIPTION

Aspects of the present disclosure provide a wearable audio output device that outputs an audio indication of a user's state with respect to a conference call. The user's state is associated with a mute status of one or more microphones on the wearable audio output device. The audio indication provides an intuitive, non-visual means to convey the user's mute status in real-time.

Figure 1:
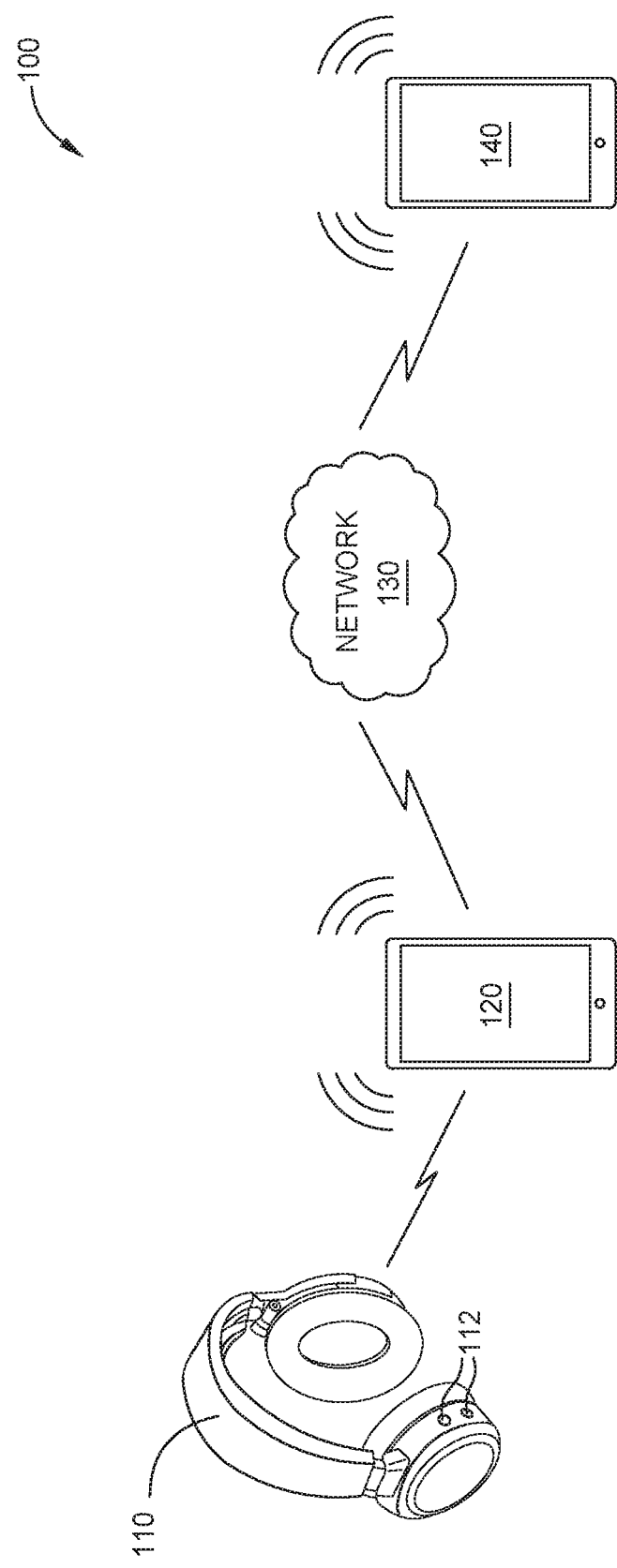
FIG. 1 illustrates an example system in which aspects of the present disclosure may be practiced.

FIG. 1 illustrates an example system 100 in which aspects of the present disclosure may be practiced. As shown, system 100 includes a wearable audio output device 110 communicatively coupled with a personal user device 120. In an aspect, the wearable audio output device 110 includes one or more microphones 112 that detect sound in the vicinity of the wearable audio output device 110 and, consequently, the user's speech.

The wearable audio output device 110 also includes at least one acoustic transducer (not illustrated, also known as driver or speaker) for outputting sound to the user. The acoustic transducer(s) may be configured to transmit audio through air and/or through bone (e.g., via bone conduction, such as through the bones of the skull).

The wearable audio output device 110 includes at least one module for activating and deactivating muting of the acoustic transducer. In an example, a hardware button is pressed and un-pressed or a switch is turned on or off to mute and unmute. In another example, the mute function is activated by a capacitive UI on the wearable audio output device 110. In another example, the user activates the mute and unmute functionality through voice-activated commands or haptic-activated actions received by the wearable audio output device 110.

In an example, a processor such as a digital signal processor (DSP) of the wearable audio output device 110 adds an audio effect or otherwise alters an audio stream of the teleconference prior to output by the speaker. As described herein, the audio effect provides an intuitive indication of the user's state. While the wearable audio output device 110 may have a visual UI, the indication of the user's state is provided by an audio indication and without a visual notification.

In one example, reverberation is added to the audio stream of the teleconference output by the wearable audio output device 110 when the wearable audio output device is muted. When unmuted, wearable audio output device does not add reverberation to the audio output stream. Therefore, when a user transitions from muted to unmuted, the wearable audio output device removes the reverberation so that the audio stream of the teleconference is more clearly heard by the user when remote participants can hear the user speak.

In another example, the audio stream is spatialized such that the audio appears to be whispered in one of the user's ear when the wearable audio output device is muted. When the wearable audio output device is unmuted, the audio stream is not spatialized and becomes centered relative to the user. Therefore, when a user transitions from muted to unmuted, the wearable audio output device removes the spatialization so that the teleconference sounds as though it is occurring in front of the user.

In another example, an audio notification is simultaneously output with the audio stream of an ongoing teleconference when the user switches between muted and unmuted. The audio notification is spatialized in a first manner when the user unmutes the microphone and the audio notification is spatialized in a second manner when the user mutes the microphone. In aspects, the audio notification provides an intuitive clue as to whether the user's microphone is muted or not. For illustrative purposes, the audio notification to indicate a mute state sounds like a door or window closing and the audio notification to indicate an unmuted state should like a door or window opening. These spatialized effects mentally conjure entering a room, and therefore the conversation, when the user is unmuted and leaving a room, and therefore leaving the conversation, when the user is muted.

In yet another example, the audio stream of the teleconference is adjusted to reduce intelligibility when the user's microphone is muted. The adjustments to reduce intelligibility are removed when the user unmutes the microphone.

In an example, the wearable audio output device simultaneously outputs an audio stream (such as background music, or directions from a navigation application) in addition to the audio of the teleconference. When the user is muted, the volume of the audio stream increases so that the user can hear the background music louder relative to the audio stream of the teleconference. When the user is unmuted, the wearable audio output device decreases the volume of the background music so that the user can more clearly hear the audio stream of the teleconference and also so that the background music is not heard well by the participants of the teleconference. The change in volume of the background music provides an indication of the user's mute status.

In aspects, the wearable audio output device 110 includes hardware and circuitry including processor(s)/processing system and memory configured to implement one or more sound management capabilities or other capabilities including, but not limited to, noise cancelling circuitry (not shown) and/or noise masking circuitry (not shown), geolocation circuitry, and other sound processing circuitry. In an aspect, the wearable audio output device 110 are wirelessly connected to a personal user device 120 using one or more wireless communication methods including but not limited to Bluetooth, Wi-Fi, Bluetooth Low Energy (BLE), other radio frequency (RF)-based techniques, or the like. In an aspect, the wearable audio output device 110 includes a transceiver that transmits and receives information via one or more antennae to exchange information with the user device 120.

In aspects, the wearable audio output device 110 may be connected to the personal user device 120 using a wired connection, with or without a corresponding wireless connection. As shown, the user device 120 may be connected to a network 130 (e.g., the Internet) and may access one or more services over the network 130. The services may include one or more cloud services.

As noted above, a user of the wearable audio output device 110 is connected to the personal user device 120. In an example, the user device 120 and network 130 support a bidirectional communication connection between the wearable audio output device 110 and the device 140. In another example, the wearable audio output device 110 is wirelessly connected to the device 140 directly via the network 130, without the personal user device 120. Hereinafter, teleconference will be used to refer to any type of call that supports at least audio between participants in different physical locations via using telecommunications systems.

While participating in a teleconference, a user may selectively want to inject their voice and/or the user's environmental noise on the call. Accordingly, the user toggles between existing in a muted state, where the microphones 112 are muted so that the other teleconference participants are not able to hear the user speak and the noises in the vicinity of the user, and an unmuted state where the microphones 112 are not muted thereby allowing the other teleconference participants to hear the user's speech and the noises in the vicinity of the user. Users may frequently toggle between a mute and unmute state to balance participating in the conversation while not disrupting the call with background noise. Often times, it is easy for the user to forget if the user is muted or not. Currently, a user checks a visual indication on the user device 120 or the audio output device 110 to determine their state with respect to the call; however, this can be cumbersome, especially when the user is on the go or not looking at the user device at the moment the user desires to potentially change states. This leads to the user unintentionally muting the wearable audio output device 110 when the user is trying to speak on a call, or unmuting the wearable audio output device 110 when the user intends to be muted. More effective methods for indicating the user's state with respect to a teleconference are needed.

While the wearable audio output device 110 illustrated in FIG. 1 is an over-the-ear headphone, any wearable audio output device with acoustic capabilities may be used to provide audio feedback regarding the user's state on a teleconference. As an example, wearable audio output device 110 may be used interchangeably with headphones, hook earbuds having an around the-ear-hook including acoustic driver module that sits above the user's ear and a hook portion that curves around the back of the user's ear, and audio eyeglass "frames."

The personal user device 120 is representative of any computing device, including cell phones, smart wearables, tablets, and computers. In an aspect, the personal user device 120 accesses a cloud server in the cloud over the network 130 using a mobile web browser or a local software application or "app" executed on the personal user device 120. In an aspect, the software application or "app" is a local application that is installed and runs locally on the personal user device 120. In an aspect, a cloud server accessible on the cloud includes one or more cloud applications that are run on the cloud server. The cloud application may be accessed and run by the personal user device 120. For example, the cloud application may generate web pages that are rendered by the mobile web browser on the personal user device 120.

Figure 2:
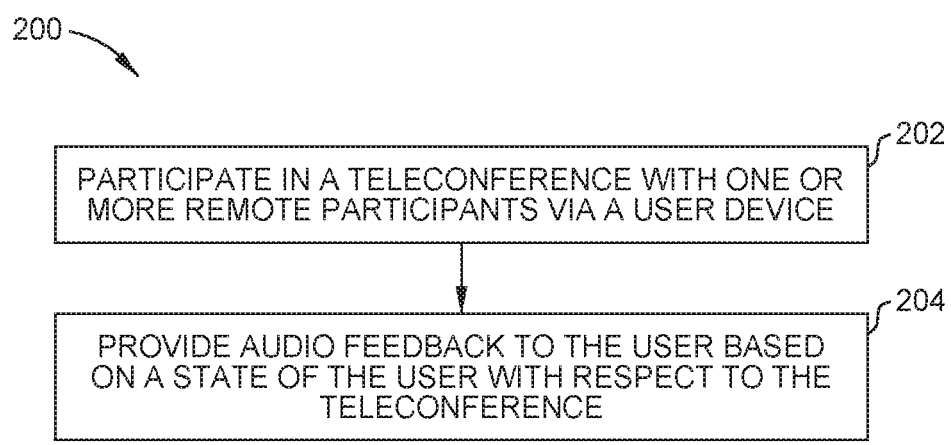
FIG. 2 illustrates example operations performed by a wearable audio output device for providing an audio indication of the user's state with respect to a teleconference, in accordance with aspects of the present disclosure.

FIG. 2 illustrates example operations 200 performed by the wearable audio output device 110 for providing audio feedback regarding the user's status with respect to a teleconference in accordance with aspects of the present disclosure. The wearable audio output device 110 includes at least one microphone 112.

At 202, the wearable audio output device 110 participates in a teleconference with one or more remote participants via the user device 120. The user of the wearable audio output device 110 and the one or more remote participants share an audio stream supported by the teleconference. In an example, one of the remote participants connects to the teleconference using the device 140 (with or without the personal user device 120).

At 204, the wearable audio output device 110 provides audio feedback to the user regarding a state of the user with respect to the teleconference. Several user states exists. In an example, the user is in a listen mode when the at least one microphone 112 of the wearable audio output device 110 is muted. In the listen mode, the user's speech and the environmental noise in the user's vicinity will not be heard by the remote participants. In an example, the user in a talk mode when the at least one microphone 112 of the wearable audio output device 110 is unmuted. In the talk mode, the user's speech and the environmental noise in the user's vicinity will be heard by the remote participants. In an example, the user is in a whisper mode. In the whisper mode, the at least one microphone is unmuted and user's speech and the environmental nose in the user's vicinity will be heard by only a subset of the remote participants. The whisper mode will be described in more detail with reference to FIGS. 3, 4A, and 4B.

Several options exist for providing audio feedback to the user regarding the state of the user with respect to the teleconference. One or more electronic effects are added to the audio stream heard by the user to indicate the user's state. In one example, the wearable audio output device 110 adds reverberation to the teleconference audio stream that is output by the speakers to the user. Adding reverberation to the audio stream reduces speech intelligibility of the voice stream because the output stream sounds as though it has been reflected even after the sound source has stopped. Intuitively, a user may perceive the remote participants as sounding like they are in a cave or as though there is a bit of echo after the remote participants talk. When the audio stream is altered in this manner, the user is muted. When the user unmutes the wearable audio output device 110, the wearable audio output device stops adding reverberation and the audio stream becomes more clear which indicates the user is not muted.

In another example, a spatialization effect is added based on the user's state. For example, when the user is muted, the voice stream is spatialized such that it sounds as though the teleconference conversation is occurring on one side (either the left or right side) of the user. This may create the perception that the user is eavesdropping on the teleconference conversation, thereby indicating the user is muted. When the user unmutes, the spatialization stops and the audio stream is centered with respect to the user. Centering the audio stream of the teleconference with respect to the user helps know they are an active part of the conversation and, therefore, indicate the microphone is unmuted.

In an example, an audio indication is output when the user switches from an unmuted state to a muted state. In aspects, the audio indication is output along with the audio stream of the teleconference. In an example, a first audio indication is output simultaneously with the audio stream of the teleconference when the user mutes the microphone and a second, different audio notification is output simultaneously with the audio stream of the teleconference when the user unmutes the microphone. To help increase the intuitive nature of the audio indication, the audio notification is spatialized in a first manner to indicate switching from muted to unmuted and the audio indication is spatialized in a second manner to indicate switching from unmuted to muted. The first manner of spatialization may sound like a door opening, to indicate the user is now in a conference room. The second manner of spatialization may sound like a door closing, to indicate the user has left the conference room.

In aspects, an audio feature that reduces intelligibility of the audio stream of the teleconference is added to the audio output by the wearable audio device to indicate the user is muted. The feature is subsequently removed when the user unmutes, thereby making the audio stream sound more clear to the user to indicate the device is unmuted.

In aspects, the user is listening to a background audio stream while participating in a teleconference. The wearable audio output device may simultaneously output both the background audio stream and the audio stream of the teleconference. Based on the difference in volume of the background audio stream relative to the teleconference, the user may intuitively determine their mute state with respect to the teleconference. For example, the wearable audio output device increases the volume of the background audio stream when the user is muted. When the user is unmuted, the audio output device decreases the volume of the background audio stream so that the audio stream of the teleconference is more clearly heard. In aspects, the wearable audio stream stops the background audio stream until the user re-mutes the microphone. Decreasing the volume of the background audio stream or refraining from outputting the background audio stream when the user is unmuted allows the user to focus on the teleconference and inject less of the background audio stream into the teleconference.

The audio indication of the user's status with respect to the teleconference is output in real time as the user transitions between states. In an example use case, the audio stream of the teleconference is altered and output to the user when the user mutes their microphone. As described above, the altered audio stream provides and audio indication of the user's muted state. Thereafter, the user switches to an unmuted state. In response, the wearable audio device alters the audio stream to indicate the unmuted state and outputs the altered audio stream. For illustrative purposes, the wearable audio output device removes reverberation, centers the audio stream, provides an audio indication that conveys the user's unmuted state, decreases the volume of a background audio stream, or otherwise makes the audio stream of the teleconference more clear to the user. The increased clarity indicates the user is not muted.

Figure 3:
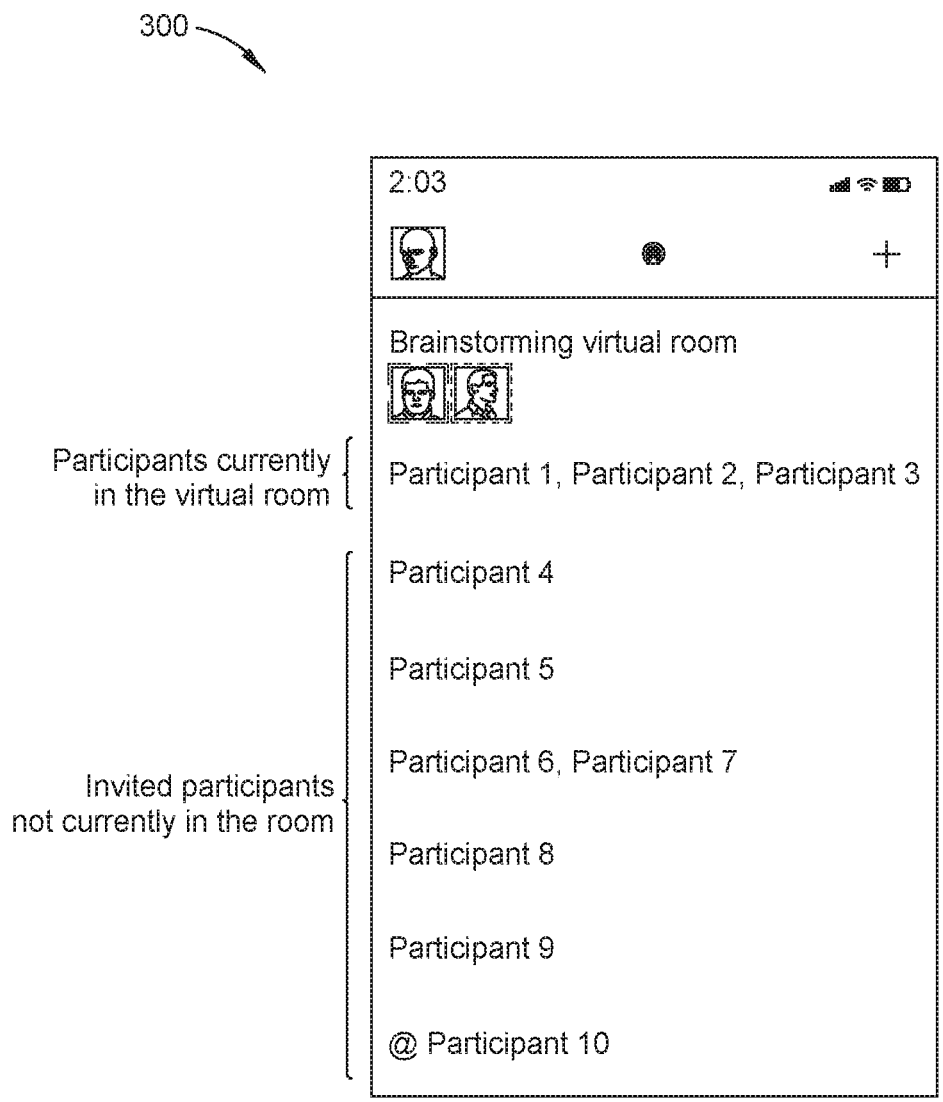
FIG. 3 illustrates an example list of members of a virtual room in accordance with aspects of the present disclosure.

An audio (and non-visual) indication of the user's status applies to conference calls that occur in virtual rooms. FIG. 3 illustrates an example list of members of a virtual room 300 in accordance with aspects of the present disclosure. The list 300 is viewed on an app displayed by a personal user device 120 that is coupled to the wearable audio output device 110.

A virtual room is a virtual audio space that provides users with access to a shared audio environment. FIG. 3 illustrates a list 300 of the multiple users that have access to virtual audio spaces. All or a subset of the users may choose to enter the virtual room and speak to each other. In an example use case, members of a development team have a brainstorming virtual room available to them. When two or more members of the development team want to discuss an idea, they may virtually join the brainstorming virtual room. They may invite other team members (or non-team members) to also join the conversation in real time. People may selectively join and leave the virtual room based on their schedule and the current topic of discussion. The virtual room exists regardless if any members are virtually present in the room at a given time.

Figure 4A:
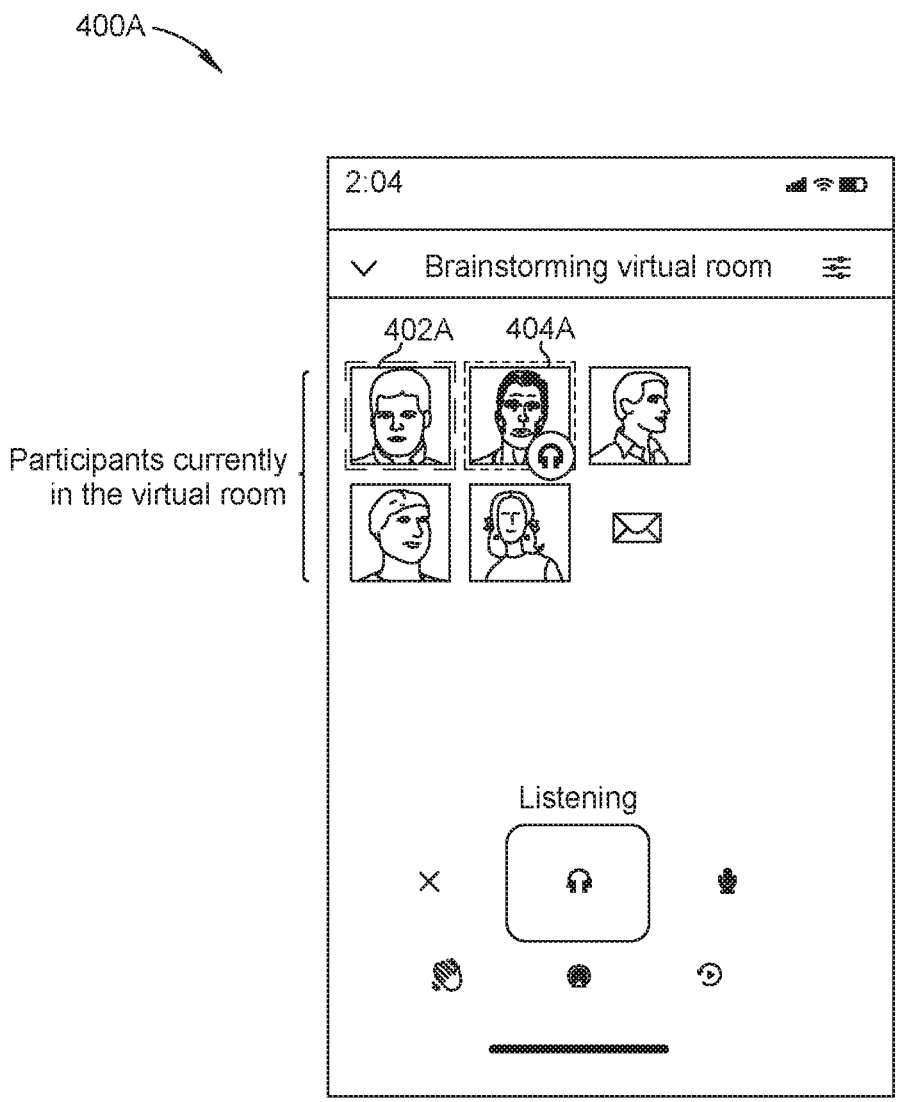
FIG. 4A illustrates an example UI illustrating current attendees of the virtual room, in accordance with aspects of the present disclosure
Figure 4B:
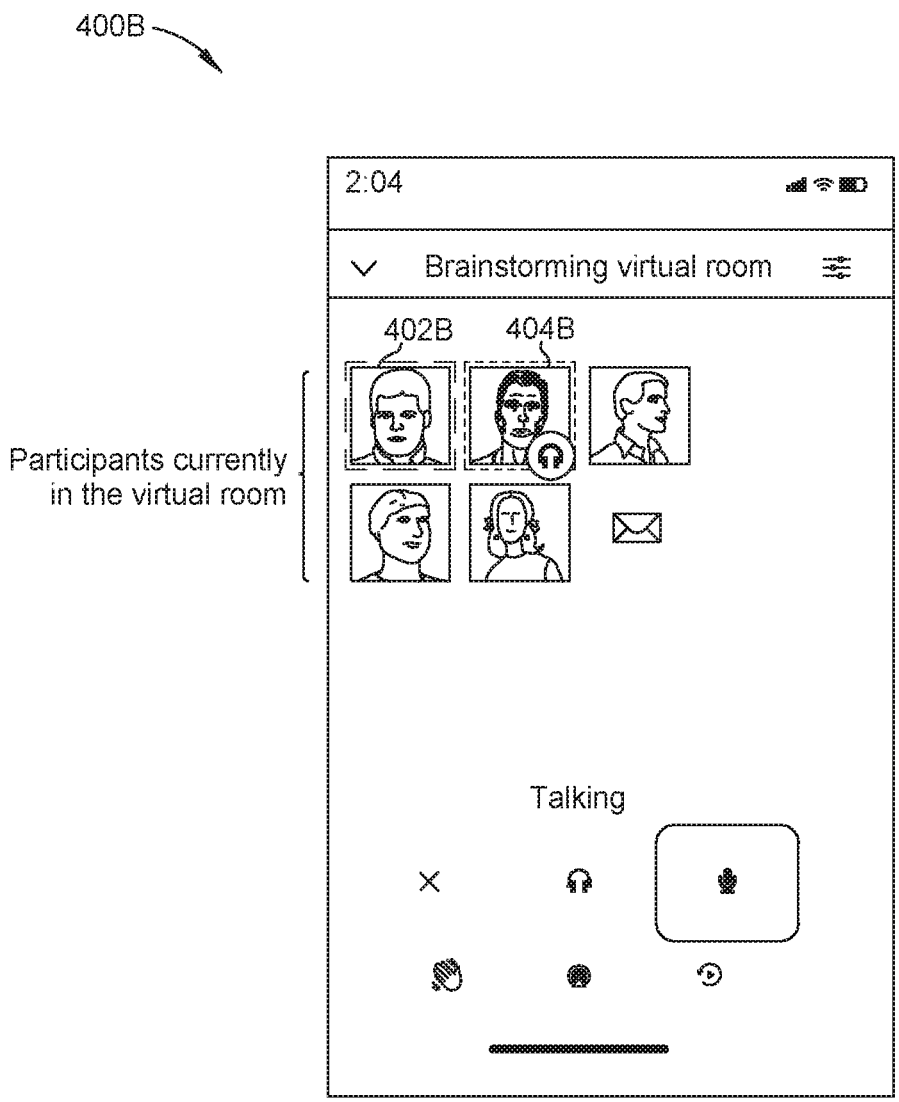
FIG. 4B illustrates an example UI illustrating current attendees of the virtual room, in accordance with aspects of the present disclosure.

FIG. 4A illustrates an example UI 400A illustrating current attendees of the virtual room when the user of the wearable audio output device 110 is in a listen mode in accordance with aspects of the present disclosure. FIG. 4B illustrates an example UI 400B illustrating current attendees of the virtual room when the user of the wearable audio output device 110 is in a talk mode in accordance with aspects of the present disclosure.

In aspects, the outlining around a participant's avatar indicates the respective participant's mute status with respect to the call. In an aspect, when a participant is unmuted their avatar has a green indication (shown as an outline around the avatar at 402A in FIG. 4A and 402B in FIG. 4B). When a participant is muted, their avatar has a yellow indication (shown as an outline around the avatar at 404A in FIGS. 4 and 404B in FIG. 4B).

In aspects, a subset of participants in the room may wish to have a side-conversation. A participant of the virtual room may use touch to draw a line and virtually connect a subset of the participants in the virtual room for the side-conversation. All of the participants in the virtual room are aware that the subset is participating in a side-conversation. Attendees of the virtual room that are not part of the side-conversation would not be able to hear the side-conversation. In this manner, the side-conversation becomes an impromptu, temporary virtual room within the larger brainstorming virtual room.

In accordance with aspects of the present disclosure, a user may join the virtual room while wearing their wearable audio output device and may participate in a side-conversation. Audio notifications are provided to the user to indicate the user is muted in the virtual room, unmuted in the virtual room, or in a whisper mode. A user is said to be in a whisper mode when a subset of teleconference participants can hear the user. In the whisper mode, the user is unmuted; however, not all virtual room attendees will hear the user's speech and environmental noise. Only members of the side-conversation within the virtual room will hear the user.

To intuitively indicate the user is in a whisper mode, the audio output device may alter the audio stream to sound as though it is being whispered in one of the user's ear. By altering the audio stream to sound like it is whispered in the user's ear, the user is aware that only a subset of participants are able to hear the user. When the user leaves the side-conversation and re-enters the conversation of the virtual room, the audio stream is altered so the user hears the audio stream through both ears.

Aspects describe an intuitive non-visual manner for alerting of user of the status with respect to a teleconference. As described herein, an audio stream is altered to indicate the user is muted, unmuted, or in a whisper mode. In aspects, the audio is adjusted to be less clear and/or sound like its coming from the user's left or right side. In aspects, the effects added to the audio stream make the user perceive they are eavesdropping on a conversation. The audio is adjusted to be more clear and sound centered relative to the user when the user is unmuted.

Descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method performed by a wearable audio output device worn by a user, including a microphone, comprising:
   participating in a teleconference with one or more remote participants via a user device, wherein the user and the one or more remote participants share an audio stream supported by the teleconference;
   determining a state of the user selected from a set of user states comprising at least:
      a listen mode wherein the microphone is muted so that speech of the user and environmental noise around the user are not heard by the remote participants,
      a whisper mode wherein the microphone is unmuted and the speech of the user and the environmental noise around the user are capable of being heard by a subset of the remote participants, and
      a talk mode wherein the microphone is unmuted and the speech of the user and the environmental noise are capable of being heard by all of the remote participants; and
   providing audio feedback to the user based on the determined state of the user with respect to the teleconference, wherein providing the audio feedback comprises adding or removing at least one of reverberation or spatialization.

2. The method of claim 1, wherein providing the audio feedback comprises:
   adding the reverberation to the audio stream when the user is in the listen mode; and
   removing the reverberation when the user subsequently changes from the listen mode to the talk mode.

3. The method of claim 1, wherein providing the audio feedback comprises:
   spatializing the audio stream when the user is in the listen mode; and
   removing the spatializing when the user subsequently changes from the listen mode to the talk mode.

4. The method of claim 1, wherein providing the audio feedback comprises:

simultaneously outputting an audio notification and the audio stream when the user switches between the listen mode and the talk mode.

5. The method of claim 4, wherein:
the audio notification is spatialized in a first manner to indicate switching from the listen mode to the talk mode, and
the audio notification is spatialized in a second manner to indicate switching from the talk mode to the listen mode.

6. The method of claim 1, wherein adding or removing at least one of the reverberation or the spatialization further comprises:
adjusting a feature of the audio stream to reduce an intelligibility of the audio stream when the user is in the listen mode; and
adjusting the feature of the audio stream to increase the intelligibility of the audio stream when the user subsequently changes from the listen mode to the talk mode.

7. The method of claim 1, wherein providing the audio feedback comprises:
outputting the audio stream to one ear of the user when the user is in the whisper mode, and
outputting the audio stream to both ears of the user when the user is in the talk mode.

8. The method of claim 1, further comprising:
simultaneously outputting a second audio stream with the audio stream supported by the teleconference,
wherein providing the audio feedback comprises adjusting the second audio stream based on the state of the user.

9. The method of claim 8, wherein adjusting the second audio stream comprises:
reducing a volume of the second audio stream from a first volume to a second volume when the microphone is unmuted; and
increasing the volume from the second volume back to the first volume when the microphone is subsequently muted.

10. The method of claim 1, wherein providing the audio feedback comprises:
altering the audio stream based on the state of the user;
outputting the altered audio stream to the user to indicate the state of the user;
after outputting the altered audio stream, determining a change in the state of the user;
re-altering the audio stream based on the change in the state of the user; and
outputting the re-altered audio stream to the user to indicate the change in the state of the user.

11. The method of claim 1, wherein the wearable audio output device does not provide a visual indication of the state.

12. A wearable audio output device comprising:
a microphone; and
at least one processor coupled to the microphone, the at least one processor configured to:
participate in a teleconference with one or more remote participants via a user device, wherein a user wearing the wearable audio output device and the one or more remote participants share an audio stream supported by the teleconference;
determine a state of the user selected from a set of user states comprising at least:
a listen mode wherein the microphone is muted so that speech of the user and environmental noise around the user are not heard by the remote participants,
a whisper mode wherein the microphone is unmuted and the speech of the user and the environmental noise around the user are capable of being heard by a subset of the remote participants, and
a talk mode wherein the microphone is unmuted and the speech of the user and the environmental noise are capable of being heard by all of the remote participants; and
provide audio feedback to the user based on the determined state of the user with respect to the teleconference, wherein providing the audio feedback comprises adding or removing at least one of reverberation or spatialization.

13. The wearable audio output device of claim 12, wherein the at least one processor provides the audio feedback by:
adding the reverberation to the audio stream when the user is in the listen mode; and
removing the reverberation when the user subsequently changes from the listen mode to the talk mode.

14. The wearable audio output device of claim 13, wherein the at least one processor provides the audio feedback by:
spatializing the audio stream when the user is in the listen mode; and
removing the spatializing when the user subsequently changes from the listen mode to the talk mode.

15. The wearable audio output device of claim 12, wherein the wearable audio output device does not provide a visual indication of the state.

16. The wearable audio output device of claim 12, further comprising:
a mute function for muting and unmuting both speech of the user and environmental noise around the user.

17. The wearable audio output device of claim 16, wherein the mute function is activated by one of a capacitive user interface on the wearable audio output device or a hardware button on the wearable audio output device.

18. A wearable audio output device comprising:
a microphone; and
at least one processor coupled to the microphone, the at least one processor configured to:
participate in a teleconference with one or more remote participants via a user device, wherein a user wearing the wearable audio output device and the one or more remote participants share an audio stream supported by the teleconference;
determine a state of the user selected from a set of user states comprising at least:
a listen mode wherein the microphone is muted so that speech of the user and environmental noise around the user are not heard by the remote participants,
a whisper mode wherein the microphone is unmuted and the speech of the user and the environmental noise around the user are capable of being heard by a subset of the remote participants, and
a talk mode wherein the microphone is unmuted and the speech of the user and the environmental noise are capable of being heard by all of the remote participants;
alter the audio stream based on the determined state of the user, wherein altering the audio stream comprises adding or removing at least one of reverberation or spatialization; and output the altered audio stream to indicate the state of the user.

19. The wearable audio output device of claim 18, wherein the at least one processor is configured to alter the audio stream by one of:
adding the reverberation to the audio stream or spatializing the audio stream when the user is in the listen mode.

\* \* \* \* \*